United States Patent Office 3,368,996
Patented Feb. 13, 1968

3,368,996
POLYALKENYL ESTERS OF POLYBASIC ORGANIC ACIDS PLASTIC COMPOSITION AND METHODS OF MANUFACTURE
Harry H. Beacham, Severna Park, Md., and Leo S. Burnett, Scarsdale, N.Y., assignors to FMC Corporation, New York, N.Y., a corporation of Delaware
No Drawing. Continuation-in-part of application Ser. No. 270,175, Apr. 3, 1963. This application Apr. 20, 1967, Ser. No. 637,320
16 Claims. (Cl. 260—40)

ABSTRACT OF THE DISCLOSURE

This application discloses polymer gels derived from poly-unsaturated, unconjugated thermosetting monomers and particularly those derived from polyalkenyl esters of polybasic organic acids, that can be prepared by polymerizing the monomer to a point of substantially complete acetone insolubility (of the order of under 10% acetone solubles based on total gel). The gel is in finely divided form and is prepared in the form of a finely divided filler impregnated with an addition polymer of a polyethylenically unsaturated, unconjugated thermosetting monomer, converted to a gel that is substantially insoluble in acetone and contains residual unsaturation, the ratio of filler to polymer being at least equal to the ratio at which the oil absorption of the filler is just satisfied by the monomer from which the polymer is derived. The finely divided gel compositions are used in making molding compositions comprising a filler and a binder comprising (a) a polymer derived from a polyalkenyl ester of polybasic organic carboxylic acid, in the form of a finely divided gel which is substantially completely insoluble in acetone, (b) an unsaturated monomer, (c) a linear polyester derived from difunctional alcohol and dibasic acid, and (d) a catalyst in concentration sufficient to convert the binder to the insoluble state at molding temperature.

The method of making the plastic composition comprises mixing (a) a filler with (b) a liquid polyalkenyl ester of a polybasic organic carboxylic acid in such proportions that the liquid is present in an amount not above that necessary to satisfy the oil absorption of the filler, and (c) a polymerization catalyst comprising a peroxide stable at a temperature of at least 120° C., heating the mixture to a temperature to induce polymerization of the ester, continuing the heating through the exotherm developed and until the ester is converted to a point where less than 10% remains soluble in acetone, and then converting the resultant products to a fine powder.

CROSS-REFERENCES TO RELATED APPLICATIONS

This application is a continuation in part of United States Patent Application No. 270,175, filed Apr. 3, 1963.

BACKGROUND OF THE INVENTION

Field of the invention

This invention relates to plastic compositions derived from poly-unsaturated, unconjugated thermosetting monomers, particularly alkenyl esters of polybasic acids, and provides low-cost compositions which can be readily and easily converted to molded and laminated structures possessing exceptional physical and electrical properties.

Description of the prior art

The first synthetic polymers—the phenol-formaldehyde resins—and their immediate descendants such as the alkyd, urea-formaldehyde and melamine-formaldehyde polymers are all thermosetting resins. The components of these resins can be reacted in stages, to first form solid soluble, fusible, storable polymers of moderate molecular weight which are, at this intermediate stage of cure, compounded with fillers, pigments, solvents and the like, to produce compositions which can be formed into films, laminated structures and molded articles and which can then be converted into the insoluble and infusible state by further treatment, generally by using heat with or without catalyst. These polymers are known as condensation polymers because they polymerize in large part by elimination of water between molecules.

With the progress of polymer chemistry, it was early recognized that, in general, cross linked thermosetting resins can be made from organic compounds which contain a plurality of double bonds which are unconjugated with respect to carbon, for example, divinyl-benzene, the allyl acrylates, and especially the polyalkenyl esters of polybasic acids such as the diallyl phthalates. However, unlike the condensation polymers, the preparation of useful, soluble, fusible intermediates is not a simple matter.

In the case, for example, of the polyalkenyl esters of polybasic acids such as the diallyl and dimethallyl phthalates, polymerization is easily induced by peroxide catalysis and heat; but useful products are not easily obtained. In general, such a polymerization, whether in mass, in suspension or in emulsion form, gels to an insoluble, three-dimensional network while the major portion of the monomer is still unreacted; and the gelled mixture, containing a major portion of monomer, is no longer readily useful in the preparation of films, laminates or molding compositions. If polymerization is stopped even just short of gelation, so much monomer remains that further conversion is slow and is accompanied by excessive shrinkage. As a result, such polymers were not commercially useful until the discovery of a method of separating monomer from the polymer in the ungelled polymerization mixture just prior to gelation, as taught by Pollack, Muskat and Strain in U.S. Patents 2,273,891, 2,370,578 and 2,377,095. As described in these patents, monomer is polymerized, at low conversions, to form a soluble, fusible polymer having residual unsaturation. The soluble polymer is precipitated with methanol or some other solvent which retains the monomer, and is then isolated for compounding, forming, and final cure to an insoluble resin. This, of necessity, produces a high cost resin, since it means the conversion of only a minor proportion of the monomer, and the recovery and recycling of unreacted monomer.

Despite their high cost, these soluble allylic polymers, generally known as prepolymers, have found a place in industry. They are particularly valuable for the production of molded parts which show excellent electrical properties, particularly under conditions of high humidity. They mold especially well and cure with minimum shrinkage, so that they are useful in the preparation of parts which require accurate molding; and they are useful in the production of laminates since they can produce superior laminates under relatively low pressure conditions, so that they are useful in the treatment of many sorts of bases (for example, wood veneer) which would be crushed if they were laminated under high pressure.

In the twenty years which have elapsed since the method of preparation of prepolymers by separation from unreacted monomer was first developed, a great deal of effort has gone into the problem of reducing their cost while retaining their excellent properties, by improving the efficiency of the method. One line of attack has resulted in improvements in the method of separating prepolymer from monomer—see, for example, Anderson et al., U.S. Patent 2,613,201, Oct. 7, 1952. However, only relatively small cost reductions are obtainable in this fashion.

A second line of attack has been the improvement of percentage conversions before gelation by the use of various control agents. Markedly higher conversions are possible by adding certain solvents which act as chain-transfer agents (for example, carbon tetrachloride) to the polymerization reaction mixture, but unfortunately, the resulting soluble polymers do not possess the desirable properties of the standard materials. Some success has been obtained by the use of catalysts which permit improved conversions before gelation. These have succeeded in increasing the original conversions from the order of 20 to 25% up to the 35% range. However, this has not been sufficient to reduce allylic prepolymers to a cost range where they would be anything but specialty materials for uses in which they are unique.

The necessity for drastic action was realized very shortly after the separation method was developed. Muskat, one of the inventors of the original separation method, early suggested (in U.S. Patent 2,403,112, issued July 2, 1946) that the gels obtained might be used to produce molding compounds without separation of prepolymers. He polymerized in the usual fashion, to a gel containing 20–25% polymer, and then continued heating to increase the percentage of polymer vis-a-vis monomer, to a preferred range of 50 to 75% of acetone insolubles. He noted that moldability of his product declined rapidly above the 75% figure, the product becoming substantially non-moldable, particularly when the percentage of acetone-insolubles (a measure of conversion) got to the 80–85% range.

Co-workers of the inventors herein had worked with the techniques disclosed in this Muskat patent in attempts to produce a diallyl phthalate molding powder substantially cheaper than the molding powder then in use, which contained prepolymer prepared from an ungelled polymerization product by methanol extraction. They confirmed Muskat's findings that optimum conversion was in the 50–75% range and that moldability became very poor as conversion rose above 80%. However, moldability was never really good with gel, even at conversions of 50%; and they never could produce moldings which were competitive with those made from prepolymers. Even neglecting the fact that the product was sluggish in following a mold, and even at optimum concentrations of acetone-insolubles, the gel compositions described by Muskat with or without added monomer failed to produce physical properties approaching those obtainable with isolated prepolymer. When fillers were incorporated with these gels by ordinary mixing techniques, the moldings gave flexural and compressive strengths of only about ½ of normal. When the compounds were subjected to high shear milling such as is used in rubber compounding and which normally is accompanied by depolymerization, the physical properties were still far below standard. It was the general opinion that the gel approach to lowering the cost of allylic phthalate resins had failed.

SUMMARY OF THE INVENTION

We have now made the discovery that, contrary to the experience of the art, gels derived from poly-unsaturated, unconjugated thermosetting monomers and particularly those derived from polyalkenyl esters of polybasic organic acids can indeed be used to prepare molding and laminating compositions and can produce compositions comparable with and often superior to those obtained with standard prepolymers, provided (a) polymerization is carried to the point of substantially complete insolubility (of the order of under 10% acetone-solubles based on total gel), (b) the gel, preferably mixed with a major portion of filler, is in finely divided form, and (c) the gelled polymer is mixed with additional soluble unsaturated polymerizable material. Surprisingly, under these conditions, the finely divided insoluble gel particles react with the additional added unsaturated polymerizable material, and more surprisingly, yield compositions which are actually markedly stronger than similar compositions with similar total quantities of the same polymerizable materials, all added in soluble form.

We do not know just why our materials give such excellent results while gels containing solubles give poor results. One hypothesis is that when gels containing solubles are mixed with soluble co-reactants, they swell, and the set core of the resultant swollen mass just cannot be gotten to for reaction. Hence, in such gels, much of the converted resin is present merely as inert filler. As the percentage of insolubles reaches above about 75% the amount of this material which cannot be reacted gets so high that molding becomes difficult to impossible. In our case, on the contrary, the finely divided, substantially insoluble but still unsaturated gel is available for reaction, there being insufficient swelling to prevent completion of reaction through the particle.

DESCRIPTION OF THE PREFERRED EMBODIMENTS

In order to produce the insoluble gelled polymer of this invention, we have found it extremely desirable to mix the soluble polymerizable liquid monomer (or partially polymerized monomer) which produces the insoluble gel with finely divided filler, in such ratio that the liquid never exceeds about the oil absorption of the filler. At about this point and below, the mixture, after conversion to the insoluble gel state, breaks up very readily into the fine particles essential for our purpose. Moreover, it is possible, by using such high ratios of filler to monomer, to get the desired degree of conversion directly from monomer in relatively short times.

We have been unable to obtain the desired degree of conversion in bulk polymerizations, since typical conversions at the point of gelation are well under 50% and the heat transfer obtainable throughout the gels is very poor. Emulsion polymerization has likewise proven of no avail since pressure would be necessary to get the high temperature essential for obtaining the desired degree of conversion, and the diallyl phthalate and other esters are hydrolyzed by water under the necessary temperature-pressure conditions. The desired complete polymerization can be obtained by suspension polymerization in inert suspending agents such as low melting alloys; but such agents are rather messy, and there are difficulties with mainttenance of suspension, and with separation of polymer from the suspending agent.

Our method of polymerizing in the presence of finely divided filler avoids all these problems. By operating with no more than about sufficient liquid to satisfy the oil absorption of the filler, the resultant solid polymer derived from the liquid is kept essentially separated by the individual filler particles, so that substantial cemented large masses of product are not obtained, and the resultant mass can be readily ground.

Oil absorption can be measured by ASTM Method D1483–60; it is the point where a mixture of filler and the liquid wetting it changes from a mixture of discrete lumps to a paste which does not break or separate, as the liquid is added drop-wise to the mass while stirring with a spatula.

We obtain more easy grinding with rapid conversion, by still another technique. As catalyst for the conversion, we use peroxides of relatively good heat stability, of the order of 120° C. and higher, e.g., dicumyl peroxide, tert-butyl perbenzoate. These peroxides are used in conventional quantity, generally 0.5 to 5% by weight of monomer. The mixture of filler, monomer and catalyst is then heated to an oven temperature of the order of 120° C. or more, depending on the particular catalyst used. The temperature selected is sufficient to cause the catalyst to produce an exothermic polymerization which drives the mixture up to a temperature of the order of 150 to 250° C. In general, conversion is sufficiently complete either at the end of the exotherm or shortly thereafter to reduce the acetone-solubles down to about 10% or less. The cake is then cooled and ground for incorporation with additional soluble reactants, with or without filler, mold release agents, coloring matter or the like to prepare the final molding compositions.

The grinding of the gelled cake is very much facilitated by the method of preparation. Since the shrinkage in going from monomer directly to completely insolubilized polymer is of the order of 12% with diallyl phthalate, for example, the resultant mass is highly strained, so that it breaks up easily. Additional strain is derived from the high temperature attained in the exotherm, whereby the brittleness of the mass is enhanced, so that grinding can be carried out at ordinary temperatures.

In these finely divided gel-filler combinations, some of the gelled resin is dispersed over or coated on the filler particles, but much of it can be seen under the microscope as independent particles of resin. Even in compositions which contained enough monomer to satisfy the oil absorption of the filler, the filler is not completely coated; calcium carbonate filler, for example, can still be decomposed by dilute aqueous acid which has no effect on the polymer. These novel compositions, produced in accordance with our invention are fine powders comprised of 50 to 90% of filler and 10 to 50% of substantially insolubilized polymers derived from poly-unsaturated, unconjugated organics; they are useful in the production of the novel molding compositions described herein.

In the preparation of our finely divided insoluble gel compositions, we have used a variety of monomers. Diallyl- and dimethallyl-, ortho, iso and terephthalates, maleates, hexahydrophthalates and chlorendates have all been used with good results, as well as the diallyl and dimethallyl esters of various aliphatic acids such as succinic, fumaric, etc. Similar polyalkenyl esters of other polybasic acids are likewise useful in our invention, and it would appear that the invention is useful with other polyunsaturated, unconjugated thermosetting monomer systems. Good results can also be obtained from diethylene glycol bis(allyl carbonate) and diallyl and dimethallyl esters of acids such as diglycolic, carbonic, adipic, oxalic, sebacic, azelaic, trimellitic and pyromellitic acids.

In preparing molding compositions from any of our powdered, filler-insolubilized gel polymer compositions, the same monomer may be used as is used in making the filler-gelled polymer mixture, or some other polyalkenyl ester of a polybasic acid may be used. However, as is well known, the polymerization rate of these monomers is rather slow, so that it is desirable to use, as part of the soluble portion of the molding, or laminating composition, an unsaturated condensation-type linear polyester such as is obtained by reacting a glycol with an unsaturated dibasic acid such as maleic acid, in combination with a polyalkenyl-polybasic acid ester. In addition, mono-unsaturated monomers such as styrene may be added to cut the cost. The liquid monomers are preferably used as such, or they may be partially polymerized to a low order of molecular weight; such partially polymerized soluble liquids may be considered monomeric for the purpose of making molding compositions from gel powder in accordance with this invention.

Since the gelled insoluble resin still has residual unsaturation, it combines with the added soluble unsaturated materials to form the backbone of the finished plastic composition after molding or lamination, and conversion. Because the gel structure will not shrink, it permits moldings to be made which are superior to those made in its absence, and in fact superior in some properties to those made with precipitated soluble prepolymer.

The preferred soluble additives are, as indicated above, mixtures containing monomers which are polyalkenyl esters of polybasic acids; and unsaturated polyesters. The ratios of ingredients used depend to some extent on the nature of the polyesters. These can be highly reactive, such as the maleates derived from simple glycols such as ethylene, propylene and diethylene glycols, or less reactive, such as mixed maleate-phthalate esters of high equivalent weight glycols such as the hydroxy alkyl ethers of bisphenol. When the glycol used is a simple glycol of low equivalent weight, the acid component of the polyester should comprise from 40 to 100 weight percent of unsaturated acid, such as maleic, fumaric, etc.; as the equivalent weight of the glycol goes up, the minimum percentage of unsaturated acid goes up. With high equivalent weight glycols such as the hydroxy alkyl ethers of bisphenol, the percentage of unsaturated acid, of total acids in the polyester, should be from about 65% to 100%.

When polyesters derived from simple glycols of low equivalent weight are used, reacted with high proportions of unsaturated acids, the polyesters may range from about 12.5 to 35% by weight of the total polymer forming ingredients, the insoluble polymer should be about 35% to 75%, and monomer should be from about 10 to 30%. With less reactive polyesters, they may comprise from about 12.5 to 40% of the total polymer forming ingredients, insoluble polymer should be from about 30 to 75%, and monomer from about 10 to 30%. The monomer preferably is largely a polyalkenyl ester of a polybasic acid such as diallyl phthalate; but mono-unsaturated monomers such as styrene and the like, can be substituted in whole or in part, with only minor disadvantages in final properties.

Optimum results seem to be obtained with about 40 to 60% of insoluble gel polymer, and 60 to 40% of solubles, based on the total polymerizables, and with polyester and monomer varying from ratios to each other of from 3 to 1 to 1 to 3.

The amount of filler used depends on its oil absorption and the use to which the compound is put. With low oil absorption fillers, we have made compositions for molding in which the filler has ranged from about 60 to 80% of the total compositions. With high oil absorption fillers, satisfactory dry mixtures which can be used for molding can be made with from about 50 to 75% filler. Where the product is used for laminating, lower proportions of filler are used.

A conventional catalyst for the system is, of course, necessary to insure curing of the molding or laminating composition. Any free radical generating catalyst which remains active at the molding temperature may be employed. Since molding temperatures of the order of 120–150° C. are conventional, the preferred catalysts, from cost considerations, are tert-butyl perbenzoate and dicumyl peroxide. In general, from about 0.1 to 1.0% catalyst based on total molding powder is employed, although the effective amount necessary obviously depends both on the formulation of the composition and on the particular catalyst used; and with any particular composition and catalyst, may be more or less than indicated.

Moldings prepared from the new molding compositions of this invention, when compared with compositions prepared from identical raw materials, but with the polymer-forming ingredients in the soluble form, exhibit equivalent to superior electrical properties, and far superior physical properties. In fact, the electrical and physical properties of our new molding compositions compare very favorably with moldings in which substantially all the polymer-forming components comprise soluble isolated prepolymer such as diallyl phthalate prepolymer, despite the fact that in the compositions of our invention, the filler loading is markedly higher than can be used with prepolymer alone.

As indicated above, it is essential in practicing our invention to convert our poly-functional monomers to the point where they have very little to no acetone-solubles left in them while still retaining residual unsaturation, i.e., almost complete conversion (about 90% or more) to gel. To get conversion from monomer to insoluble gel in commercially practical times, the mixture of monomer, catalyst and filler should be heated to an oven temperature which will induce an exotherm with the particular catalyst used, but which, at the same time, is not so high as to destroy the catalyst before the reaction is complete. For example, with diallyl orthophthalate, tertiary butyl perbenzoate and a calcium carbonate filler (Duramite), in an ordinary oven, a temperature of 120° C. minimum is required to produce the exotherm and which then carries the reaction up to about 200° C. If, however, oven temperatures are above 160° C. sufficiently high conversion is not obtained, due apparently to the fact that a substantial part of the catalyst is destroyed before the exotherm is reached. When conveyor type ovens are used, the rate of travel and temperature profile are so regulated that the exotherm is induced and maintained.

With other monomers, the temperatures necessary to produce the desired reactions vary somewhat. Diallyl isophthalate is somewhat more reactive than diallyl phthalate, yielding an exotherm at 110° C. under the above conditions. Diallyl maleate is even more reactive, the exotherm beginning just below 100° C. and reaching 240° C. within a few minutes. Diallyl hexahydrophthalates and diallyl chlorendates react very similarly to diallyl phthalate. The dimethallyl compounds are somewhat more sluggish than the diallyl compounds, yielding lower exotherm peaks and being more difficult to completely convert.

We have used a wide variety of water insoluble, inert, inorganic fillers in preparing our products. Calcium carbonate, both precipitated and wet ground types, has proven to be a very useful filler because of its low cost, its low oil absorption, low abrasiveness and good electrical properties. Calcium carbonate fillers yield compositions with excellent compressive strength but with less desirable flexural strengths.

Acicular calcium silicate (Wollastonite) has considerably higher oil absorption than the calcium carbonate, but its needle like crystal habit gives molded compositions somewhat better flexural strengths. It is extremely interesting that in the process of this invention, powdered Wollastonites generally show higher flexural strengths than fibrous grades. Silica has been used, but is generally so hard and refractory to the grinding mills that it is uneconomical. Hydrated clays tended to cause premature decomposition of the peroxide catalyst and to prevent the desired insolubilization of the gel. However, calcined clays did not show this effect and were quite useful. Any other finely divided filler can be used with due attention being given to the desired end use. However, fibrous fillers are not economical for use in the insolubilization process, since on grinding of the cake, the fibrous material of the filler is destroyed. Where fibers are wanted in the final composition, they can be added in untreated form to the powdered combination of filler and insolubilized polymer or added to the soluble polymerizable materials, in the preparation of the final molding composition.

Other fillers which can be used in practicing this invention can include: chalk, limestone, calcium sulfate (anhydrous), barium sulfate, asbestos, glass (powdered), quartz, aluminum trihydrate, aluminum oxide, antimony oxide, inert iron oxides, and ground stone such as granite, basalt, marble, limestone, sandstone, phosphate rock, travertine, onyx and bauxite.

In the preparation of the cake of filler and gel, processability is enhanced by the use of wetting or coupling additives, such as lauric acid, stearic acid, metal soaps such as zinc and calcium stearate, unsaturated silanes and the like. These wetting agents lower the apparent oil absorption of the fillers with the monomers employed, and permit larger concentrations of filler to be used vis-a-vis polymerizables, at equivalent final physical properties. Moreover, they help to prevent separation of monomer during processing. Apparently, the fillers are wet more readily at high temperatures than at room temperatures, so that a filler apparently wet at room temperature without a wetting aid, will spew monomer on heating, and a mass of resin will separate and end up in a partially converted unsatisfactory form. Hence, we prefer to either use wetting agents, or mill under high shear in their absence, to insure adequate dispersion of filler and monomer before polymerization.

The monomer, filler, and catalyst are mixed under conditions which insure good wetting; a sigma-blade type mixer or blender is adequate where small amounts of a wetting agent are used. This mixture is placed on trays and placed in an oven; if the mixture is at the oil absorption point, this may be an ordinary air-circulation oven, or a tunnel oven with a conveyor; if the mixture is below the oil absorption point and is thus porous, an inert atmosphere is used in the oven. The oven is at a temperature of 100 to 140° C., depending on the monomer and catalyst used. An exotherm is generally induced within about 30 to 90 minutes, and the temperature of the cake goes up, to the order of 180 to 250° C. The cake is held in the oven for a total of about 1 to 2 hours, and then discharged, broken up and finely ground. The grinding may be done in hammer, ball, roller or other mills. In general, we prefer to grind to a particle size of the order of 100 mesh, although satisfactory results are obtained at about 40 mesh and finer; there seems to be no lower limit to particle size which is useful, but obviously grinding becomes uneconomic as it approaches 200 mesh and finer.

These powders containing insolubilized polymer are then blended, in a ribbon or similar blender, with the soluble polymer forming ingredients which are in liquid form, and with coloring matters, additional powdered or fibrous fillers, mold release agents, catalyst, etc. The resultant mixture is a fluffy powder, which is densified in conventional fashion, e.g., by passing over a two-roll mill, or by being forced through an extruder—to produce the desired molding compounds. Where non-fibrous or short fibered fillers are used, the densified product breaks up quite easily into free flowing granules, which can be fed into molds in conventional fashion. Where long fibered fillers are used, the densified product tends to cling together somewhat, so that somewhat different but still conventional handling techniques are used.

The following examples are given as typical of our invention, without being limiting thereof. In the examples, all parts are by weight.

*Example 1.—Diallyl phthalate composition*

To 100 pts. of diallyl phthalate monomer were added 3 pts. tert-butyl perbenzoate and 2 pts. lauric acid and the mixture warmed with stirring until a clear solution was obtained. The solution was then combined with 450 pts. finely divided calcium carbonate (Duramite) and mixed in a Hobart blender until a smooth stiff paste resulted; this represents a filler to liquid ratio just at oil absorption. This was spread on an aluminum foil-covered tray in a sheet about three-fourths inch thick and placed in a circulating air oven at 120° C. A thermocouple placed in the center of the cake indicated that a gradual increase in temperature occurred as the mass warmed to about 120° C. in thirty minutes. The rate then increased appreciably reaching a peak of 185° C. after a total elapsed time of 55 minutes and then slowly dropped back to oven temperature in an additional 50 minutes.

The hard but brittle cake was removed from the oven, cooled and then ground to a particle size of less than 100 mesh in a Fitz Mill Model M Comminuting Machine. Acetone extraction of the finely ground cake for 24 hrs. in a Soxhlet extractor showed that 94% of the allylic monomer had been converted to insoluble crosslinked-resins.

To prepare a molding compound from the gelled polymer 50 pts. of a linear unsaturated polyester resin, prepared from equimolecular proportions of di-(4-hydroxy propoxyphenyl)propane and fumaric acid by the procedure given in U.S. Patent No. 2,662,069, were dissolved in an equal weight of diallyl phthalate monomer. The solution was catalyzed with 3 pts. tert-butyl perbenzoate and 2 pts. lauric acid was added as a mold lubricant. To this, 550 pts. of the finely ground gelled cake was added and the compound sheeted on a cold two-roll rubber mill. The resulting compound exhibited excellent compression and transfer molding characteristics. Data obtained on compression molded parts at 2000 p.s.i., five minutes at 300° F. are given in Table I.

*Example 2.—Diallyl isophthalate composition*

The procedure of Example 1 was repeated except that diallyl isophthalate was substituted for diallyl phthalate in the preparation of the gel. In this case the exotherm began at 105° C. or slightly lower than with diallyl phthalate and reached a maximum of 205° C. Conversion to insoluble polymer was 92%. Results obtained on compounding in the diallyl phthalate-polyester composition of Example 1 were substantially the same except that a higher heat deflection temperature was achieved in molded articles. Properties are listed in Table I.

*Example 3.—Diallyl maleate composition*

Diallyl maleate was substituted for diallyl phthalate in the preparation of the gel of Example 1. The gelation exotherm initiated at 90° C. and reached a peak of 238° C. Conversion to insoluble polymer was 98%. Again on combination with the diallyl phthalate-polyester composition of Example 1, a molding compound was obtained possessing excellent characteristics and an exceptionally high heat deflection temperature.

*Example 4.—Diallyl chlorendate composition*

The gel composition of Example 1 was repeated using diallyl chlorendate in place of diallyl phthalate in the preparation of the gelled cake. Results substantially identical with Example 1 were obtained. In addition to the other excellent properties, a high level of fire retardance was also obtained.

*Example 5.—Diallyl hexahydrophthalate composition*

Diallyl hexahydrophthalate was substituted for diallyl phthalate in the gel portion of Example 1. The peak exotherm obtained was 200° C. and the conversion to insoluble polymer was 99.6%. When this finely ground gel and calcium carbonate were compounded with the diallyl phthalate-polyester composition of Example 1, a molding compound of excellent properties was obtained.

*Example 6.—Dimethallyl phthalate composition*

Example 1 was repeated using dimethallyl phthalate in the gel portion. The peak exotherm was somewhat lower, 150° C., as well as conversion to insoluble resin of 90%. The finely ground gel and filler yielded an excellent molding compound except that the heat deflection temperature was only 150° C.

The properties of the products of Examples 1 to 6 are noted in the following table.

TABLE I.—ALLYLIC MONOMERS IN CAKE

| Example | 1 | 2 | 3 | 4 | 5 | 6 |
|---|---|---|---|---|---|---|
| Shrinkage (in./in.) | 0.004 | 0.006 | .005 | .008 | .004 | .009 |
| H.D.T., °C | 185 | 239 | 239 | 161 | 200 | 150 |
| Izod, ft. lbs | 0.33 | 0.34 | 0.33 | 0.34 | 0.32 | 0.32 |
| Rockwell: | | | | | | |
| M | 104 | 104 | 106 | 103 | 103 | 102 |
| E | 75 | 79 | 82 | 73 | 75 | 71 |
| Compressive (p.s.i.) | 18,500 | 20,210 | 21,720 | 15,360 | 17,630 | 19,380 |
| Flexural (p.s.i.) | 7,500 | 8,050 | 7,280 | 5,550 | 6,690 | 7,270 |
| Modulus ×10$^6$ | 1.60 | 1.66 | 1.79 | 1.69 | 1.62 | 1.65 |
| Moisture Absorp. (percent) | 0.12 | 0.09 | 0.16 | 0.08 | 0.08 | 0.11 |
| Spec. Gravity | 1.99 | 1.96 | 2.01 | 2.14 | 1.95 | 1.95 |
| D.C. 10$^3$/10$^6$ | 5.55/5.35 | 5.34/5.15 | 5.54/5.40 | 4.34/5.24 | 5.37/5.22 | 5.24/5.12 |
| D.C. 10$^3$/10$^6$ (wet) | 5.70/5.42 | 5.36/5.18 | 5.60/5.41 | 5.41/5.24 | 5.38/5.23 | 5.26/5.14 |
| D.F. 10$^3$/10$^6$ | .005/.006 | .005/.005 | .006/.006 | .005/.004 | .006/.004 | .004/.004 |
| D.F. 10$^3$/10$^6$ (wet) | .004/.006 | .006/.005 | .007/.006 | .006/.005 | .006/.005 | .005/.005 |
| Vol. Resty. (ohm cm.) | 9.1×10$^{15}$ | 4.7×10$^{15}$ | 1.1×10$^{16}$ | 6.8×10$^{15}$ | 4.2×10$^{15}$ | 5.0×10$^{15}$ |
| Surf. Resty. (ohm) | 4.3×10$^{14}$ | 1.5×10$^{15}$ | 2.6×10$^{15}$ | 2.0×10$^{15}$ | 3.3×10$^{15}$ | 1.1×10$^{15}$ |
| Vol. Res. (R.T.) | 6.0×10$^{13}$ | 6.3×10$^{13}$ | 8.8×10$^{13}$ | 6.3×10$^{13}$ | 6.3×10$^{13}$ | 8.3×10$^{13}$ |
| Vol. Res. wet (hrs.) | a >2.5×10$^{15}$ | a >2.5×10$^{15}$ | a 2.5×10$^{15}$ | b <6.3×10$^5$ | c 2.5×10$^9$ | d 2.6×10$^7$ | a 720 hrs.    b 48 hrs.    c 168 hrs.    d 336 hrs.

The various properties reported above are all measured under the test methods indicated below:

Heat Deflection Temperature, ASTM D-648, two ½" x ½" x 4" bars.

Izod Impact, ASTM D-256, five ½" x ½" x 4" bars cut in two to give a total of 10 specimens. Measures impact strength.

Compressive Strength, ASTM D-695, five ¼" x ½" x 4" bars. Hardness, ASTM D-785, any piece.

Flexural Strength and Modulus of Elasticity, ASTM D-790, five ¼" x ½" x 4" bars.

Dielectric Constant (DC) and Dissipation Factor (DF), ASTM D-150, two ⅛" x 2" discs.

Volume and Surface Resistivity, ASTM D-257, two ⅛" x 4" discs.

Volume and Surface Resistance (long term), Mil-M-14F, two ⅛" x 4" discs.

Moisture Absorption (48 hr.), ASTM D-570-59aT, two ⅛" x 2" discs.

*Example 7.—Diallyl phthalate-Wollastonite composition*

To 100 parts of diallyl phthalate were added 3 parts of dicumyl peroxide, 2 parts lauric acid and 2 parts tris-(beta-ethoxyethoxy)vinyl silane and solution obtained by gentle warming. This was blended with 450 parts of finely divided Wollastonite (Cab-o-Lite P-1) to yield a soft, damp porous mass. This was placed in an oven heated to 140° C. through which a slow stream of nitrogen was passed to maintain a partial inert atmosphere. A thermocouple placed in the mass indicated that an exotherm to 200° C. occurred approximately 50 minutes after placing in the oven. Total heating time in the oven was 90 minutes. On cooling a soft easily pulverized mass was obtained. Acetone extraction showed that conversion to insoluble polymer was greater than 95%. This was ground in a ceramic ball mill to 100% through a 100 mesh screen.

A syrup was prepared by dissolving 50 parts of a linear polyester of diethylene glycol and maleic anhydride in an equal weight of diallyl phthalate monomer. To this was added 3 parts dicumyl peroxide, 2 parts tris(beta-ethoxyethoxy)vinyl silane and 2 parts calcium stearate. This was compounded on a cold two-roll rubber mill with 550 parts of finely ground Wollastonite-diallyl phthalate gel. A molding compound exhibiting excellent characteristics was obtained. Data for compression molded samples cured two minutes at 330° F. and 2,000 p.s.i. are listed in Table II.

*Example 8*

Example 7 was repeated except that the amount of calcium silicate filler was increased to 900 parts per 100 parts diallyl phthalate. Results were substantially the same except that the exotherm temperature reached only 185° C. When 550 parts of this finely ground gel-filler composition were combined with the diallyl phthalate-polyester syrup of Example 7, a molding compound showing extremely high compressive strength, approximately 37,000 p.s.i. resulted.

*Example 9.—Diallyl phthalate-clay composition*

Nine parts of dicumyl peroxide and six parts of tris-(beta-ethoxyethoxy)vinyl silane were dissolved in 300 parts of diallyl phthalate monomer. This solution was blended with 750 parts calcined clay (Glomax HE) to form a stiff paste which was cured for two hours in a circulating air oven at 120° C. The resulting hard cake was ground in a Fitz Mill to a fine particle size and then combined with 200 parts of polyester-diallyl phthalate syrup of Example 1 to form a compound of excellent molding and electrical characteristics. A one-eighth inch molded disc showed a volume resistance of greater than $2.5 \times 10^{16}$ ohms after exposure to 100% relative humidity at 70° C. for 720 hrs.

*Example 10.—Diallyl phthalate-silica composition*

Example 1 was repeated except that finely divided silica was used in place of calcium carbonate. Results were substantially the same.

Results of Examples 7, 8, 9 and 10 are shown in Table II.

TABLE II

| Example | 7 | 8 | 9 | 10 |
| --- | --- | --- | --- | --- |
| H.D.T. ° C | 223 | 262 | 145 | 163 |
| Izod (ft. lbs.) | 0.35 | 0.41 | 0.31 | 0.33 |
| Compressive (p.s.i.) | 29,180 | 36,430 | 27,200 | 27,420 |
| Rockwell: | | | | |
| M | 110 | 113 | 105 | 108 |
| E | 90 | 99 | 80 | 88 |
| Flexural (p.s.i.) | 11,270 | 11,350 | 9,420 | 10,620 |
| Modulus $\times 10^6$ | 1.81 | 2.41 | 1.28 | 1.69 |
| Water Absorp. (percent) | 0.30 | 0.30 | 0.21 | 0.14 |
| Specific Gravity | 2.07 | 2.21 | 1.81 | 1.951 |
| D.C. $10^3/10^6$ | 5.1/4.9 | 5.3/5.1 | 4.2/4.0 | 3.9/3.9 |
| D.C. wet | 5.2/4.9 | 5.4/5.2 | 4.3/4.1 | 4.0/3.9 |
| D.F. $10^3/10^6$ | .014/.010 | .011/.008 | .009/.006 | .008/.005 |
| D.F. wet | .016/.010 | .012/.009 | .013/.007 | .010/.006 |
| Vol. Resty. (ohm cm.) | $2.6 \times 10^{15}$ | $1.9 \times 10^{15}$ | $3.2 \times 10^{15}$ | $3.6 \times 10^{15}$ |
| Surf. Resty. (ohm) | $1.8 \times 10^{15}$ | $5.1 \times 10^{14}$ | $5.3 \times 10^{13}$ | $3.11 \times 10^{14}$ |
| Vol. Rest. (ohm) | $3.8 \times 10^{13}$ | $4.2 \times 10^{12}$ | $4.5 \times 10^{13}$ | $4.5 \times 10^{13}$ |
| Vol. Rest. (wet) | a$7.6 \times 10^8$ | a$9.1 \times 10^5$ | b$2.5 \times 10^{16}$ | c$4.5 \times 10^9$ | a 292 hrs.  b 720 hrs.  c 716 hrs.

*Example 11.—Glass reinforced composition*

808.5 parts by weight of the ground diallyl phthalate-calcium carbonate cake of Example 1 were tumbled with 7.2 parts zinc stearate. A syrup was prepared from equal parts of diallyl phthalate, and the polyester resin (diethylene glycol-maleate) of Example 7; to this syrup 2% of tris(beta-ethoxyethoxy)vinyl silane and 2% dicumyl peroxide were added. The cake and 82 parts by weight of syrup were blended on a two-roll mill to a dry powdery mix. Sixty parts of this powdery mix was stirred into 240 parts of additional syrup; this thin slurry, the residual cake and 284 parts of half-inch glass fibers (Ferro Chem. HSI) were mixed in a Patterson mixer for 1½ minutes to yield a dough like premix.

The composition when molded gave very excellent physicals, particularly heat deflection temperature, impact and flexurals; its electrical properties were excellent, except that the excellent moisture resistance was lost. Results are shown in the following Table III.

TABLE III

| Example | 11 | 12 |
| --- | --- | --- |
| H.D.T. (° C.) | >300 | >300 |
| Izod (ft. lbs.) | 4.11 | 1.4 |
| Rockwell: | | |
| M | 107 | 102 |
| E | 89 | |
| Flexural (p.s.i.) | 16,500 | 10,190 |
| Modulus ($\times 10^6$) | 1.43$\times 10^6$ | 1.78 |
| Compressive | | |
| Specific Gravity | | 2.00 |
| Moisture Absorp. (percent) | | 0.10 |
| D.C. $10^3/10^6$ | 5.36/5.17 | 5.4/5.2 |
| D.C. wet | a$9.80/6.54$ | 5.4/5.3 |
| D.F. $10^3/10^6$ | a0.011/0.008 | .006/.006 |
| D.F. wet | a0.136/0.042 | .008/.006 |
| Vol. Resty. (ohm-cm.) | $1.6 \times 10^{15}$ | $6.3 \times 10^{16}$ |
| Surf. Resty. (ohm-cm.) | $2.0 \times 10^{14}$ | $1.8 \times 10^{16}$ |
| Vol. Res. (ohm) | $2.5 \times 10^{14}$ | $1.0 \times 10^{15}$ |
| Vol. Res., wet (ohm) | b$1.4 \times 10^9$ | c>$2.5 \times 10^{16}$ | a 24 hrs. boil.
b 48 hrs.
c 720 hrs.

*Example 12*

Less glass, in the product of Example 11, gives somewhat lower physicals, but much better retention of electricals under high moisture conditions. Thus, a composition made like that of Example 11, but using only 15% glass on the total composition, gave results which are compared with those of Example 11 in Table III.

*Example 13.—Use of diallyl maleate in syrup for molding*

Example 1 was repeated, using diallyl maleate as the monomer in preparing a molding powder from the gelled cake. It will be noted, by referring to Table IV, that except for a slightly higher heat deflection temperature, results vary but slightly from Example 1.

*Example 14.—Diallyl maleate composition*

Example 3 was repeated, using diallyl maleate instead of diallyl phthalate as the monomer in the syrup used for preparing the final molding composition. Again comparing results (shown for Example 14 in Table IV, for Example 3 in Table I), it will be noted that there are no notable differences in properties.

*Example 15.—Styrene composition*

Example 1 was repeated, except that the syrup used to make the molding powder consisted of equal parts of styrene and the polyester resin of Example 1. As will be noted from Table IV, the heat deflection temperature is down sharply, as is the flexural strength; but the electrical properties are excellent, and are retained under wet conditions except for volume resistivity. Thus, the compositions, though not as useful as those with polyalkenyl esters of polybasic acids as the added monomers, nonetheless show marked utility.

TABLE IV

| Example | 13 | 14 | 15 |
|---|---|---|---|
| H.D.T. (° C.) | 213 | 250 | 153 |
| Izod (ft. lbs.) | 0.33 | 0.33 | |
| Compressive (p.s.i.) | 19,830 | 22,810 | |
| Rockwell: | | | |
| M | 102 | 106 | 99 |
| E | 74 | 85 | |
| Flexural (p.s.i.) | 7,250 | 7,840 | 5,990 |
| Modulus ($\times 10^6$) | 1.64 | 1.78 | 1.59 |
| Moisture Absorp. (percent) | 0.19 | 0.36 | 0.11 |
| Specific Gravity | 1.98 | 1.99 | 1.94 |
| D.C. $10^3/10^6$ | 5.3/5.2 | 5.5/5.3 | 5.2/5.1 |
| D.C. wet | 5.4/5.3 | 5.6/5.4 | 5.2/5.1 |
| D.F. $10^3/10^6$ | .004/.005 | .006/.006 | .003/.004 |
| D.F. wet | .005/.006 | .007/.007 | .004/.005 |
| Vol. Resty. (ohm-cm.) | $2.7 \times 10^{15}$ | $1.8 \times 10^{15}$ | |
| Surf. Resty. (ohm) | $1.8 \times 10^{15}$ | $1.4 \times 10^{15}$ | |
| Vol. Rest. (ohm) | $5.0 \times 10^{13}$ | $2.5 \times 10^{13}$ | $5.6 \times 10^{13}$ |
| Vol. Rest. wet (ohm) | a $2.5 \times 10^{16}$ | b $1.6 \times 10^{15}$ | c $1.2 \times 10^{9}$ | a 384 hrs.
b 456 hrs.
c 1,368 hrs.

Obviously, these examples can be multiplied indefinitely by varying the monomers and fillers used in preparing the insolubilized gel cake, by varying the monomers and polyesters in the syrups used for making the compositions to be molded and/or laminated, and by using various fillers, catalysts, mold release agents, pigments and the like.

The compositions of the examples are extremely light colored; they can be prepared in all colors from white to black by adding the appropriate pigment to the mix used in preparing the molding powder. Untreated fillers can likewise be used with no effect on the final properties, provided sufficient insolubilized gelled polymer is present to meet the limitations set forth in the claims, which define the invention.

What is claimed is:

1. A composition comprising a finely divided, water insoluble, inert, inorganic filler impregnated with an addition polymer of poly-ethylenically unsaturated, unconjugated thermosetting monomer selected from the group consisting of allyl and methallyl esters of polybasic organic carboxylic acids, polymerized at a temperature not substantially less than 100° C. in the presence of at least 0.5% by weight, based on the total weight of the polymerizable material, of a peroxide polymerization catalyst to form a gel which is at least 90% insoluble in acetone and contains residual unsaturation, the ratio of filler to polymer being at least equal to the ratio at which the oil absorption of the filler is just satisfied by the monomer from which the polymer is derived.

2. A composition comprising a finely divided, water insoluble, inert, inorganic filler impregnated with an addition polymer of a polyalkenyl ester of a polybasic organic carboxylic acid polymerized at a temperature not substantially less than 100° C. in the presence of at least 0.5 % by weight, based on the total weight of the polymerizable material, of a peroxide polymerization catalyst to form a gel which is at least 90% insoluble in acetone and contains residual unsaturation, the ratio of filler to polymer being at least equal to the ratio at which the oil absorption of the filler is just satisfied by the monomer from which the polymer is derived.

3. The composition of claim 2 in which the filler is selected from the group consisting of calcium carbonate, calcium silicate, clay, silica, glass, chalk, limestone, calcium sulfate (anhydrous), barium sulfate, asbestos, quartz, aluminum trihydrate, aluminum oxide, antimony oxide, inert iron oxides, granite, basalt, marble, sandstone, sand, phosphate rock, travertine, onyx and bauxite.

4. The composition of claim 2 in which the polybasic organic carboxylic acid is selected from the group consisting of phthalic, isophthalic, maleic, chlorendic, hexahydrophthalic, terephthalic, succinic, fumaric, carbonic, adipic, oxalic, sebacic, azelaic, trimellitic and pyromellitic acids.

5. The composition of claim 2 in which the polymer is derived from diallyl phthalate.

6. A molding composition comprising a water insoluble, inert, inorganic filler and a binder comprising (a) a polymer derived from a polyalkenyl ester of a polybasic organic carboxylic acid selected from the group consisting of allyl and methallyl esters of a polybasic organic carboxylic acid, in the form of a finely divided gel which is 90% insoluble in acetone and contains residual unsaturation, the filler being impregnated with the polymer, the ratio of filler to polymer being at least equal to the ratio at which the oil absorption of the filler is just satisfied by the monomer from which the polymer is derived, (b) an unsaturated monomer, (c) a linear polyester derived from a di-functional alcohol and a dibasic acid, at least 40% of which dibasic acid is unsaturated, (a) comprising 30 to 75%, (b) comprising 10 to 30%, and (c) comprising 12.5 to 40%, of all of (a) plus (b) plus (c), and at least 0.1% based on the total weight of the polymerizable material, of a peroxide polymerization catalyst to convert the binder to the insoluble state at molding temperature.

7. A molding composition comprising a water insoluble, inert, inorganic filler and a binder comprising (a) a polymer derived from a polyalkenyl ester of a polybasic organic carboxylic acid selected from the group consisting of allyl and methallyl esters of polybasic organic carboxylic acids, in the form of a finely divided gel which is 90% insoluble in acetone and contains residual unsaturation, the filler being impregnated with the polymer, the ratio of filler to polymer being at least equal to the ratio at which the oil absorption of the filler is just satisfied by the monomer from which the polymer is derived, (b) an unsaturated monomer, and (c) a linear polyester derived from a difunctional alcohol of 2-4 carbon atoms and a dibasic acid at least 40% of which is unsaturated, (a) comprising 35–75%, (b) comprising 10–30%, and (c) comprising 12.5 to 35%, of all of (a) plus (b) plus (c), and a catalyst in concentration sufficient to convert the binder to the insoluble state at molding temperature.

8. A molding composition comprising a water insoluble, inert, inorganic filler and a binder comprising (a) a polymer derived from a polyalkenyl ester of a polybasic organic carboxylic acid selected from the group consisting of allyl and methallyl esters of a polybasic organic carboxylic acid, in the form of a finely divided gel which is 90% insoluble in acetone and contains residual unsaturation, the filler being impregnated with the polymer, the ratio of filler to polymer being at least equal to the ratio at which the oil absorption of the filler is just satisfied by the monomer from which the polymer is derived, (b) an unsaturated monomer, and (c) a linear polyester derived from a di(hydroxyalkyl) ether of bisphenol and a dibasic acid at least 65% of which is unsaturated, (a) comprising 30 to 75% (b) comprising 10 to 30%, and (c) comprising 12.5 to 40%. of all of (a) plus (b) plus (c) and at least 0.1% by weight based on the total weight of the polymerizable material, of a peroxide polymerization catalyst to convert the binder to the insoluble state at molding temperature.

9. A molding composition comprising a water insoluble, inert, inorganic filler and a binder comprising (a) a polymer derived from a polyalkenyl ester of a polybasic organic carboxylic acid selected from the group consisting of allyl and methallyl esters of a polybasic organic carboxylic acid, in the form of a finely divided gel which is 90% insoluble in acetone and contains residual unsaturation, the filler being impregnated with the polymer, the ratio of filler to polymer being at least equal to the ratio at which the oil absorption of the filler is just satisfied by the monomer from which the polymer is derived, (b) an unsaturated monomer, (c) a linear polyester derived from difunctional alcohol and dibasic acid, at least 40% of which dibasic acid is unsaturated, (a) comprising 40 to 60%, and (b) plus (c) comprising 60 to 40%, of all of (a) plus (b) plus (c), the ratio of (b) to (c) varying from 3 to 1 to 1 to 3, and 0.1% by weight, based on the total weight of the polymerizable material of a peroxide polymerization catalyst to convert the binder to the insoluble state at molding temperature.

10. A molding composition comprising a water insoluble, inert, inorganic filler and a binder comprising (a) a polymer derived from a polyalkenyl ester of a polybasic organic carboxylic acid selected from the group consisting of allyl and methallyl esters of polybasic organic carboxylic acids, in the form of a finely divided gel which is 90% insoluble in acetone and contains residual unsaturation, the filler being impregnated with the polymer, the ratio of filler to polymer being at least equal to the ratio at which the oil absorption of the filler is just satisfied by the monomer from which the polymer is derived, (b) a monomeric polyalkenyl ester of a polybasic organic acid, (c) a linear polyester derived from difunctional alcohol and dibasic acid, at least 40% of which dibasic acid is unsaturated, (a) comprising 30 to 75%, (b) comprising 10 to 30%, and (c) comprising 12.5 to 40%, of all of (a) plus (b) plus (c), and 0.1% by weight, based on the total weight of the polymerizable material, of a peroxide polymerization catalyst to convert the binder to the insoluble state at molding temperature.

11. The composition of claim 10, in which (b) is a monomer selected from the class consisting of diallyl and dimethallyl esters of dibasic organic carboxylic acids.

12. The composition of claim 10, in which (b) is a diallyl phthalate, and A is derived from diallyl phthalate.

13. The method of making a plastic composition comprising mixing (a) 50 to 90% of a finely divided water insoluble inert, inorganic filler with (b) 10 to 50% of a liquid polyalkenyl ester of a polybasic organic carboxylic acid selected from the group consisting of allyl and methallyl esters of polybasic organic carboxylic acid and in such proportion that the liquid is present in an amount not above that necessary to satisfy the oil absorption of the filler, and (c) 0.5% by weight, based on the total weight of the polymerizable material, of a polymerization catalyst comprising a peroxide stable at temperatures of at least 120° C., heating the mixture to a temperature of not substantially less than 100° C. to induce polymerization of the ester, continuing heating through the exotherm developed and until the ester is converted to a gel which is at least 90% insoluble in acetone and then converting the resultant product to a fine powder.

14. The method of claim 13 in which the liquid is insufficient to satisfy the oil absorption of the filler, and the heating is conducted in an inert atmosphere.

15. The method of claim 13 in which the filler is selected from the group consisting of calcium carbonate, calcium silicate, clay, silica, glass, chalk, limestone, calcium sulfate (anhydrous), barium sulfate, asbestos, quartz, aluminum trihydrate, aluminum oxide, antimony oxide, inert iron oxides, granite, basalt, marble, sandstone, sand, phosphate rock, travertine, onyx and bauxite.

16. The method of claim 13 in which the polybasic organic carboxylic acid is selected from the group consisting of phthalic, isophthalic, maleic, chlorendic, hexahydrophthalic, terephthalic, succinic, fumaric, carbonic, adipic, oxalic, sebacic, azeleic, trimellitic and pyromellitic acids.

References Cited

UNITED STATES PATENTS

| | | | |
|---|---|---|---|
| 3,331,891 | 7/1967 | Thomas | 260—862 |
| 2,403,112 | 7/1946 | Muskat | 260—96 |
| 3,207,816 | 9/1965 | Dugliss | 260—866 |
| 3,221,081 | 10/1965 | Sarradin | 260—864 |
| 3,078,249 | 2/1963 | Russel | 260—40 |
| 2,757,160 | 7/1956 | Anderson | 260 40 |

JULIUS F. ROME, Primary Examiner.